Aug. 26, 1969     S. P. MATTHEWS     3,462,845

APPARATUS FOR MAINTAINING AN ELEVATION

Filed April 29, 1966     2 Sheets-Sheet 1

Sarazon P. Matthews
INVENTOR.

BY Harris and Larkin
ATTORNEYS

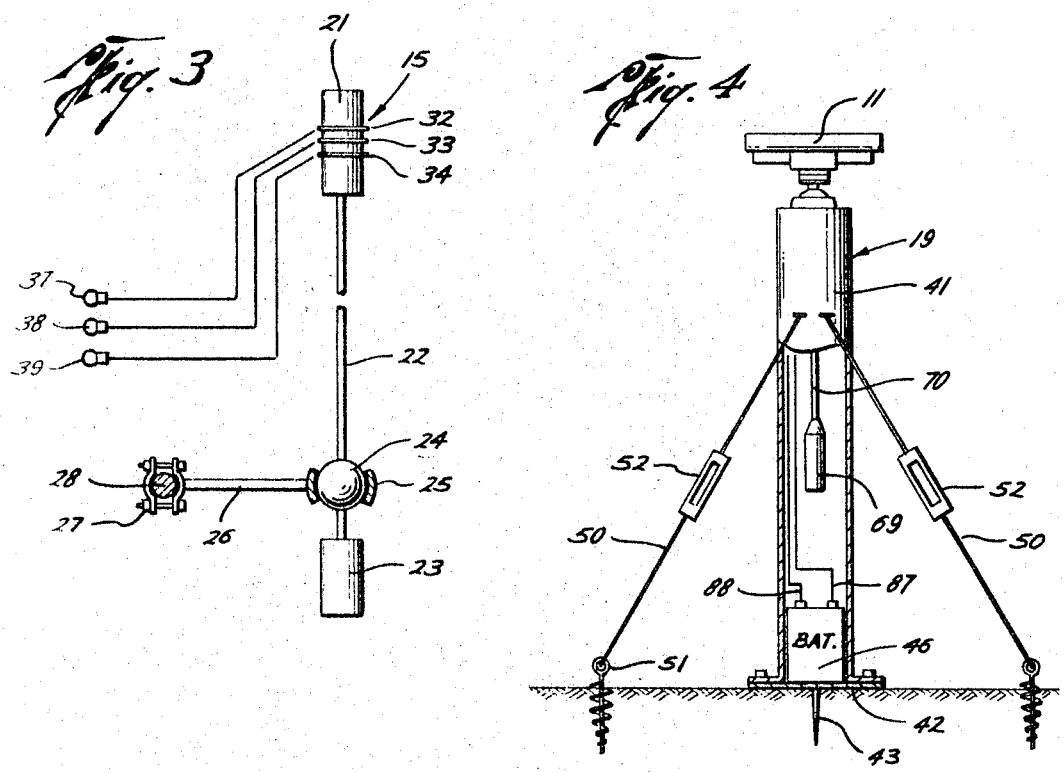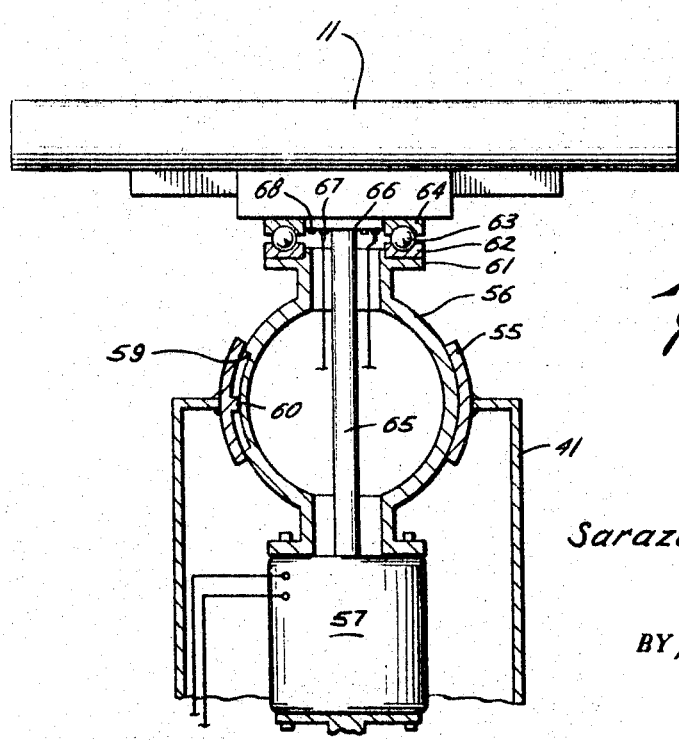

United States Patent Office 3,462,845
Patented Aug. 26, 1969

3,462,845
APPARATUS FOR MAINTAINING AN ELEVATION
Sarazon P. Matthews, Rte. 2, Box 168,
Sulphur, La. 70663
Filed Apr. 29, 1966, Ser. No. 546,444
Int. Cl. G01c 21/04, 21/10
U.S. Cl. 33—46                                   4 Claims

ABSTRACT OF THE DISCLOSURE

Apparatus for surveying a grade elevation such as a contour line. A pendulously leveled rigidly securable support mounts a laser beam source which is rotated in a horizontal datum plane. To follow the contour line, a receiver is pendulously carried by a vehicle and is responsive to the laser beam during its rotation to detect whether the receiver is above or below the datum plane, and actuates indicating means accordingly.

---

This invention relates to an apparatus for maintaining an elevation. More particularly, this invention relates to an apparatus and method for maintaining a predetermined elevation, as for example, the establishment of a grade line or grade elevation as in surveying operations. This invention is particularly useful in establishing terrace lines used in leveling fields for irrigation purposes.

In some types of irrigation, as for example, in irrigating rice fields it is necessary to establish levees which differ in elevation from each other by a matter of 2, 4, 6 or 8 inches or the like. Hence, the levees follow a grade line such that the vertical spacing between the levees is maintained at a constant uniform distance and are therefore, usually snake like in appearance.

At the present time, it is common practice for a surveyor to set up a transit in a portion of the field and then to lay out the lines of levees with two assistants, one of whom is sometimes referred to as a "stick man" and the other as the "marker."

The prior art method of surveying levees required that the instrument man and the stick man be experienced operators. If the third man, i.e., the marker, is not experienced, he must be guided by the stick man through the field. If this practice is not followed, the marker tends to "zig-zag" from one target point to the next. It is desirable in surveying levees that they should not "zig-zag" to any great extent, but rather follow graceful curves. The experienced stick man finds the curves around the mounds and sloughs by occasionally placing the stick down the course of desired plane. The proper course is not always maintained by inexperienced stick men.

By contrast, the apparatus of this invention provides a great improvement over the prior art method. More particularly, the invention herein provides an apparatus which may have constant contact with the surface of the earth, when the receiver is mounted on a vehicle. This provides an accurate guide to thereby maintain a graded contour elevation.

The apparatus of this invention requires only one operator to do the whole surveying operation, which surveying can be done faster and cheaper than prior art methods. A farmer who is laying out levees does not have to have an experienced helper, nor does he have to be experienced himself, since he is guided by signals. Quite often there is a shortage of experienced stick men to carry out the prior art method of surveying. Therefore, many farmers have in the past surveyed their levees as early as the fall of the year. This may be costly because as the farmer works his field over these levees, they are thereby torn down. Therefore, at a later date he must rebuild them so as to be able to find them after planting has been completed.

With this invention, the surveying of levees can be carried out at a time which is convenient to the farmer. He can plow and work his field without worry over losing levee lines. He can even plant his fields and then subsequently survey and lay out the levees. Thus, the farmer is freed from the time schedule of the surveyor.

In this application the terms "surveyor and "surveying" are to be used broadly and include those operations for establishing grade elevations such as those useful in construction work and the like. Nevertheless, the invention is useful since it reduces the number or operators required to carry out a particular surveying operation.

It is, therefore, an object of this invention to provide an improved apparatus for carrying out certain surveying operations which provides solutions to the foregoing problems and which requires a minimum of operators for performing the operation.

Briefly stated, the apparatus of this invention includes a laser beam source mounted for rotation in a preselected plane for projecting a laser beam along the preselected plane. Support means are provided which are spacially movable with respect to the source. Receiver means which are responsive to the laser beam are mounted on the support means for detecting relative vertical spacing thereof with respect to the laser beam during rotation thereof.

The laser source of energy is pulsed at a fixed frequency. This energy is focused through a set of prisms to make the beam focus on a small target which might be approximately 2,000 feet away for example. The source is made to rotate at approximately 30 r.p.m. so that the receiver means may intercept the laser beam when placed in the same horizontal plane.

The receiving means may consist of a plurality of sensors, as for example, three separate sensors, one of which is adapted to indicate too high, one too low, and the other on target with respect to the plane through which the laser beam is being rotated. The sensor means may be connected to appropriate indicator means to indicate or read out whether or not the receiver means is above or below or on target with respect to the laser beam.

The laser source is mounted on a tripod or other support and can be leveled using conventional spirit levels or by means which will automatically place it in the level position.

Briefly stated, the method of using this invention comprises the steps of rotating a laser beam source through a preselected plane and projecting a laser beam along the plane during rotation thereof. The laser beam is then detected at a point or points spaced apart from the source during rotation thereof. The method also includes the step of detecting the vertical elevation of the point or points relative to the detected beam.

Reference to the drawings will further explain the invention wherein like numerals refer to like parts and in which:

FIG. 3 is a schematic side elevation view of one form of the detector or receiver means of this invention.

FIG. 4 is a side elevation view, partially in central section, showing one embodiment of the laser beam source of this invention.

FIG. 5 is an enlarged central sectional view showing the mounting means for the laser beam source and the means for rotation thereof.

Figure 1:
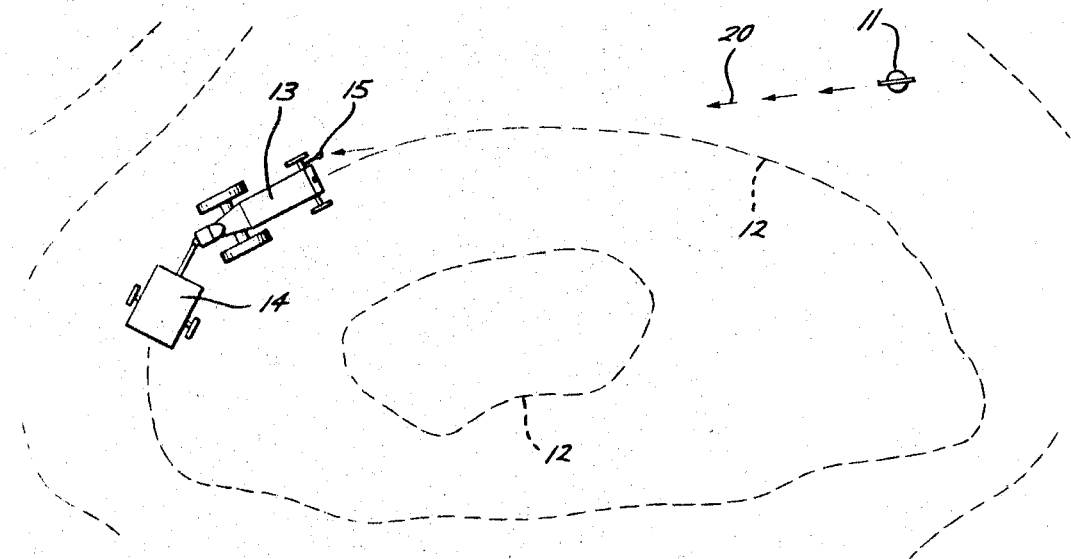
FIG. 1 is a schematic plan view of a field which is being surveyed with the apparatus of this invention.

Referring now to FIG. 1, the laser beam source 11 is shown positioned in a field having desired and vertically spaced apart contour lines 12 shown in broken lines. Source 11 is adapted for rotation as will be explained hereinafter.

A vehicle such as tractor 13 pulling plow 14 is shown being driven along a path of travel which is coincident with one of the desired contour lines 12. Tractor 13 has mounted thereon receiver means 15 which is adapted to intercept the laser beam during rotation thereof and to indicate the relative vertical spacing of the path of travel followed by the vehicle relative to the laser beam.

Figure 2:
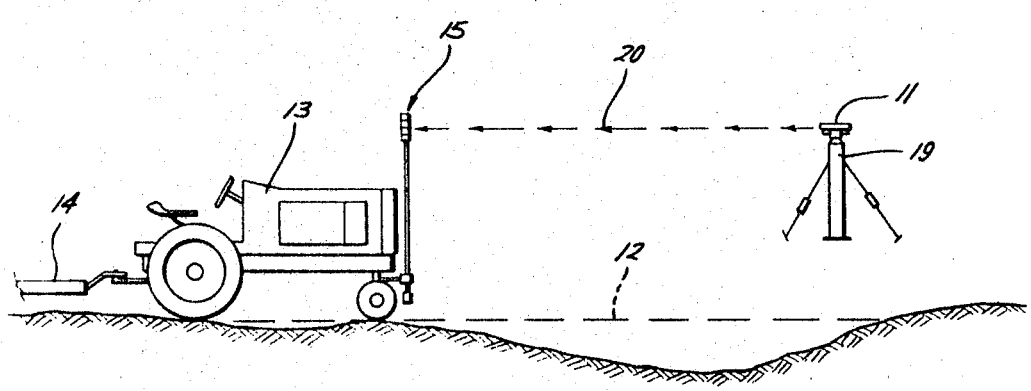
FIG. 2 is a schematic side elevation view of the laser beam source and detector means shown in FIG. 1.

Referring now to FIG. 2, source 11 is shown mounted on appropriate mount 19 such that source 11 can be rotated through a preselected plane, as for example, a horizontal plane indicated by constant horizontal reference plane 20.

Referring now to FIG. 3, receiver means 15 includes a cylindrical member 21 mounted on upright support rod 22 the lower end of which supports a heavy weight such as weight 23. Spaced just above weight 23 and secured to rod 22 is a ball 24 which is mounted for pendulous type rotation in socket bushing 25 which is supported by horizontal support rod 26 which is connected by clamp 27 to a portion of the tractor, as for example, axle pin 28 of the tractor. Thus, it can be seen that during movement of the tractor over rough terrain weight 23 will continue to hold support rod 22 in the vertical position since ball 24 can rotate in bushing 25. As a result cylindrical member 21 and the elements associated therewith are maintained a fixed vertical distance above the path of travel followed by the tractor.

Cylindrical member 21 has secured thereabout three sensor means in the form of upper photoelectric ring 32, middle photoelectric ring 33 and lower photoelectric ring 34. Photoelectric rings 32, 33 and 34 are respectively connected by appropriate leads to indicator means in the form of lights 37, 38 and 39 which are mounted on tractor 13 at an appropriate place for viewing by the tractor operator. Photoelectric rings 32, 33 and 34 are adapted to be responsive to the laser beam when it is placed in the same plane therewith such that during rotation of the laser beam as will be explained hereinafter, the receiver means will indicate or detect the relative vertical spacing of the vehicle with respect to the laser beam. More specifically, when middle electric ring 33 is in the same plane through which the laser beam source is rotating, then light 38 will be turned to the "on" position indicating to the vehicle operator that the vehicle is following the desired contour. Middle electric ring 33 may sometimes be described as a predetermined elevation datum on member 21. If the vehicle should decline vertically relative to the laser beam, then upper photoelectric ring 32 would intercept the beam and cause light 37 to switch on. If it should occur that the vehicle traveled a course which was higher relative to the laser beam, then lower photoelectric ring 34 would intercept the laser beam and turn light 39 on. Thus, by monitoring the lighting of lights 37, 38 and 39, the operator can direct the vehicle so that the path of travel thereof follows the desired contour line. It is to be understood that other indicator means could be used besides lights, for example, horns could be conveniently used having different pitches or different volume.

Referring now to FIG. 4, laser beam source mount 19 is shown generally and includes a cylindrical body member 41 connected to and supported above base 42 having an anchor spike 43 projecting downwardly into the earth's surface. Body member 41 has mounted therein a DC power source in the form of battery 46 having leads 87 and 88 connected thereto and leading upwardly therefrom.

Body member 41 is supported in a vertical position by means of a plurality of bracing wires 50 connected at the upper end to the upper portion of body member 41 and at their lower end to anchors 51 having threads which permit them to be threadably engaged in the ground adjacent to base 42. In addition, each of the wires 50 is provided with a turn buckle 52 to permit tightening thereof so that body member 41 is supported in a non-movable condition and resistant to the effects of wind thereon.

Laser beam source 11 is shown generally mounted on top of body member 41 and reference to FIG. 5 will further explain the arrangement thereof.

The top of body member 41 is provided with bushing housing 55 which supports therein, hollow ball member 56 the lower end of which is connected to and supports motor and gear housing 57 in which is supported a motor which is connected by appropriate leads to leads 47 and 48 leading to battery 46 or other appropriate power source.

Ball member 56 is provided with a vertically extending slot 59. Key 60, which is attached to a portion of bushing housing 55 is adapted to fit into slot 59. With this arrangement, it is possible for ball member 56 to swing freely pendulant fashion but is held against rotation on its vertical axis relative to bushing housing 55.

The top end of ball member 56 is formed with an upper flange 61 which supports thereabove lower race 62 of a bearing which includes ball bearings 63 and upper race 64, the latter of which supports the bottom portion of laser source 11.

Source 11 is caused to rotate by operation of motor drive shaft 65 which is connected and driven by the motor in motor and gear housing 57 at one end and is connected to connector 66 at the upper end, which is connected to laser source 11. Connector 66 supports on the lower side thereof an inner slip ring 67 and outer slip ring 68 which are connected by appropriate leads leading to a power source for laser source 11 and which could be a DC source such as battery 46.

During operation of laser source 11 it is mounted as shown in FIGS. 4 and 5 with power being applied to the motor in motor and gear housing 57, causing drive shaft 65 to rotate at an appropriate r.p.m., such as 30 r.p.m., thereby causing laser source 11 to rotate therewith.

During rotation of laser source 11, electrical power is supplied thereto through slip rings 67 and 68. Key 60 prevents rotation of ball member 56 but nevertheless permits ball member 56 to swing pendulant fashion as the result of a heavy weight 69 supported on support rod 70 connected to the lower end of motor and gear housing 57. In other words, weight 69 acts as a plumb bob as the result of the effect of gravity thereon, thereby insuring that laser source 11 is maintained in a level condition such that the laser beam projected therefrom follows a horizontal plane.

It is to be understood that conventional spirit levels could be used for accomplishing the leveling. However, the device shown in FIGS. 4 and 5 accommodates for any out of level condition that could be caused by wind against body member 41.

It is to be understood that if it were desired to project the laser beam in a plane that was other than in the horizontal, then weight 69 could be rotatably secured centrally inside body member 41 and laser source 11 inclined to the desired slope or angle. Then by rotation of laser source 11, it would be possible to project a laser beam through a plane that was other than horizontal, as for example, one having a grade inclination of a specified degree, such as a grade level that might be followed by a road bed or the like.

It is to be understood that laser source 11 is of the conventional type and is pulsed at a fixed frequency. It is focused through a set of prisms to make the beam focus on a small target, say approximately 2,000 feet away, this being considered the average distance that a vehicle will be operating from the source during surveying of terrace lines.

A typical laser source which could be utilized in connection with the present invention is shown in Spectra-Physics Laser Technical Bulletin No. Three published October 1963 by Spectra-Physics, Inc., Mountain View, Calif. This bulletin shows the type of prisms which could be used for focusing the laser beam. Other bulletins which show the general operation of laser sources which could be utilized in connection with the present invention include Spectra-Physics Laser Technical Bulletins No. 1, 2 and 4 by Spectra-Physics, Inc., Mountain View, Calif., copyrighted in 1963.

Various models of laser beam sources which could be utilized are shown in Spectra-Physics Gas Laser Catalogue published by Spectra-Physics, Inc., 1255 Terra Bella Ave., Mountain View, Calif.

In operation of the apparatus of this invention and in carrying out the method therefor, laser source 11 is mounted in the field in the manner shown in FIGS. 1, 2 and 4. Receiver 15 is mounted on tractor 13 in the manner shown in FIGS. 1, 2 and 3 with laser source 11 rotating as described above. Horizontal reference plane 20 is then established which can be detected by one of the photoelectric rings 32, 33 and 34. By observing lights 37, 38 and 39, the operator of vehicle or tractor 13 can cause the tractor to follow a path of travel such that reference plane 20 contacts target or middle photoelectric ring 33. When there is any deviation therefrom such that either light 37 or 39 comes on indicating that there has been a movement away from the desired elevation, the operator can adjust the direction of travel of tractor 13 either up or down grade, depending upon whether light 37 or 39 comes on. In other words, light 37 would indicate that the path being followed by tractor 13 was below the desired contour line whereas light 39 would indicate that the path being followed by tractor 13 is above the desired contour line. By having a plow pulled behind tractor 13, there is automatically established a marking for the desired contour line by the operator of vehicle 13 merely changing direction of travel thereof in response to the indications provided by lights 37, 38 and 39.

It is to be understood that receiver 15 need not be supported on a vehicle, but could be supported on a hand held rod which could be carried from point to point and thereby establish the desired contour line. In any event, the receiver means will still be described as being mounted on support means which are spacially movable with respect to the laser source to thereby detect the relative vertical spacing of the receiver means with respect to the laser beam.

What is claimed is:

1. In a surveying apparatus, the combination comprising:

a first support means for supporting a laser beam source and having means for automatically leveling said source and for securing said source in said level condition;

a laser beam source mounted on said first support means for rotation in a horizontal plane and for projecting a laser beam along said plane;

second support means spacially movable with respect to said source for supporting receiver means thereon;

receiver means attached to said second support means and having a predetermined elevation datum and arranged to be responsive to said laser beam from 360° in said plane and for detecting vertical spacing of said datum with respect to said laser beam during rotation of said beam;

and indicator means connected to said receiver means for indicating whether the grade elevation of said datum is above or below said plane.

2. The invention as claimed in claim 1 including:

a vehicle mounting said second support means, whereby said indicator means indicates the grade elevation of said vehicle relative to said plane.

3. The invention as claimed in claim 1 wherein:

said receiver means includes a plurality of vertically spaced sensors, each of which is responsive to said laser beam when placed in alignment with said plane to receive said laser beam.

4. The invention as claimed in claim 1 wherein:

said first support means comprises anchor means for anchoring said first support means to the ground.

References Cited

UNITED STATES PATENTS

| 1,246,960 | 11/1917 | Logan | 33—46 |
| 1,922,791 | 8/1933 | Bumpus | 33—46 |
| 2,085,671 | 6/1937 | Powers. | |
| 2,538,112 | 1/1951 | Maier. | |
| 2,571,287 | 10/1951 | Peters. | |
| 2,580,954 | 1/1952 | Przybylski. | |
| 3,242,340 | 3/1966 | Layne. | |
| 3,321,248 | 5/1967 | Williamson et al. | |

FOREIGN PATENTS

| 600,214 | 7/1934 | Germany. |

ROBERT B. HULL, Primary Examiner

U.S. Cl. X.R.

33—73